(12) United States Patent
Makita et al.

(10) Patent No.: US 11,790,306 B2
(45) Date of Patent: Oct. 17, 2023

(54) SERVER APPARATUS, VEHICLE, SERVICE PROVISION SYSTEM, AND NON-TRANSITORY STORAGE MEDIUM STORING PROGRAM

(71) Applicant: Toyota Jidosha Kabushiki Kaisha, Toyota (JP)

(72) Inventors: Mitsugu Makita, Nagoya (JP); Daigo Fujii, Tsushima (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 932 days.

(21) Appl. No.: 16/280,400

(22) Filed: Feb. 20, 2019

(65) Prior Publication Data
US 2019/0258990 A1 Aug. 22, 2019

(30) Foreign Application Priority Data
Feb. 22, 2018 (JP) .................. 2018-029716

(51) Int. Cl.
*G06Q 10/0832* (2023.01)
*H04W 4/40* (2018.01)
(Continued)

(52) U.S. Cl.
CPC ....... *G06Q 10/0832* (2013.01); *G05D 1/0027* (2013.01); *G05D 1/0212* (2013.01);
(Continued)

(58) Field of Classification Search
CPC .............. G06Q 10/0832; G07F 17/12
See application file for complete search history.

(56) References Cited

U.S. PATENT DOCUMENTS

| 4,803,348 A * | 2/1989 | Lohrey ............ G07F 9/02 |
| | | 235/383 |
| 6,218,929 B1 * | 4/2001 | Furuta ......... G07C 9/00309 |
| | | 340/5.1 |

(Continued)

FOREIGN PATENT DOCUMENTS

| CN | 104276137 A | 1/2015 |
| CN | 204472653 U | 7/2015 |

(Continued)

OTHER PUBLICATIONS

Denver Water, The Laundry Truck of Denver, May 31, 2017, www.youtube.com (Year: 2017).*

(Continued)

*Primary Examiner* — Jeff Zimmerman
*Assistant Examiner* — Matthew Parker Goodman
(74) *Attorney, Agent, or Firm* — Dinsmore & Shohl LLP

(57) ABSTRACT

A server apparatus, a vehicle, a service provision system, and a non-transitory storage medium storing a program are disclosed. The server apparatus includes circuitry configured to transmit, to an information terminal of a user, information regarding a service available to the user, receive, from the information terminal, information regarding the service, selected by the user, receive, from the information terminal, package information regarding a package of the user, first location information indicating a location to receive the package from the user, first time information indicating a time to receive the package from the user, second location information indicating a location to return the package, and second time information indicating a time to return the package, and arrange a specified vehicle based on the package information, the first location information, and the first time information.

13 Claims, 6 Drawing Sheets

(51) Int. Cl.
*G05D 1/00* (2006.01)
*G05D 1/02* (2020.01)
*G06Q 10/00* (2023.01)
*H04W 4/02* (2018.01)

(52) U.S. Cl.
CPC .............. *G06Q 10/00* (2013.01); *H04W 4/40*
(2018.02); *H04W 4/025* (2013.01)

(56) References Cited

U.S. PATENT DOCUMENTS

| | | | |
|---|---|---|---|
| 6,974,077 | B1 | 12/2005 | Beyder et al. |
| 10,310,499 | B1* | 6/2019 | Brady ................. G05D 1/0291 |
| 11,237,569 | B2* | 2/2022 | Kuo ................. G06Q 10/08355 |
| 2002/0080030 | A1* | 6/2002 | Inomata .............. G07F 17/0014 340/542 |
| 2003/0040944 | A1 | 2/2003 | Hileman |
| 2004/0059613 | A1 | 3/2004 | Ford et al. |
| 2007/0197261 | A1* | 8/2007 | Humbel .............. H04L 63/0853 455/558 |
| 2009/0302105 | A1* | 12/2009 | Cassady ................. D06F 95/00 235/381 |
| 2011/0161227 | A1* | 6/2011 | Santo, Jr. ............... G06Q 10/20 705/305 |
| 2014/0052660 | A1* | 2/2014 | Lee ........................ G06Q 10/04 705/338 |
| 2014/0058896 | A1 | 2/2014 | Jung |
| 2014/0136414 | A1* | 5/2014 | Abhyanker .......... G05D 1/0011 701/25 |
| 2015/0332531 | A1* | 11/2015 | Davidsson .......... E05B 47/0001 70/256 |
| 2016/0099927 | A1* | 4/2016 | Oz ....................... G07C 5/0808 726/9 |
| 2018/0068253 | A1* | 3/2018 | Simms ................. G05D 1/0276 |
| 2019/0392663 | A1* | 12/2019 | Miller ................ G07C 9/00174 |

FOREIGN PATENT DOCUMENTS

| | | | |
|---|---|---|---|
| CN | 105453129 | A | 3/2016 |
| CN | 205768914 | U | 12/2016 |
| JP | H05185870 | A | 7/1993 |
| JP | 2003-242221 | A | 8/2003 |
| JP | 2004026397 | A | 1/2004 |
| JP | 2004-538223 | A | 12/2004 |
| JP | 2005-056194 | A | 3/2005 |
| JP | 2007-244690 | A | 9/2007 |
| JP | 2016-021213 | A | 2/2016 |
| JP | 6266151 | B1 | 1/2018 |
| JP | 7122906 | B2 * | 8/2022 |
| KR | 2005004460 | A * | 1/2005 |
| KR | 2011002115 | U * | 3/2011 |
| KR | 1020140023209 | A | 2/2014 |
| WO | 03/014883 | A2 | 2/2003 |
| WO | 2014146169 | A1 | 9/2014 |
| WO | 2016/054248 | A1 | 4/2016 |
| WO | 2017/035052 | A1 | 3/2017 |

OTHER PUBLICATIONS

Steven Benna, Laundry disruptor, Sep. 9, 2016, Business Observer: Florida's newspaper for the c-suite, https://www.businessobserverfl.com/news/2016/sep/09/laundry-disruptor/ (Year: 2016).*

* cited by examiner

FIG. 4

| VEHICLE ID | LATITUDE | LONGITUDE | OPERATIONAL STATUS | TRAVEL STATE | ROUTE INFORMATION |
|---|---|---|---|---|---|
| A | Xa | Ya | | TRAVELING | |
| B | Xb | Yb | | PARKING | |
| C | Xc | Yc | | TRAVELING | |
| D | Xd | Yd | | TRAVELING | |
| E | Xe | Ye | | PARKING | |
| ... | ... | ... | ... | ... | ... |
| ... | ... | ... | ... | ... | ... |

SERVER APPARATUS, VEHICLE, SERVICE PROVISION SYSTEM, AND NON-TRANSITORY STORAGE MEDIUM STORING PROGRAM

CROSS-REFERENCE TO RELATED APPLICATION

This application claims priority to Japanese Patent Application No. 2018-029716 filed on Feb. 22, 2018, incorporated herein by reference in its entirety.

BACKGROUND

1. Technical Field

The present disclosure relates to a server apparatus, a vehicle, a service provision system, and a non-transitory storage medium storing a program.

2. Description of Related Art

Service for receiving a package from a user and delivering the received package to a specified place is known.

For example, Japanese Patent Application Publication No. 2004-026397 (JP 2004-026397 A) discloses a warehouse operation system. In the system, a home-delivery locker is installed in living quarters of a user. When the user inputs a package deposit request with an operation keyboard provided in the home-delivery locker, and transmits the request to a control center, the control center sends a package pickup and delivery instruction to a delivery center of a contracted transportation company by telephone or other means so as to deliver the package stored in the locker to a warehouse of a cooperating warehouse company.

SUMMARY

However, the warehouse operation system disclosed in JP 2004-026397 A requires installation of the home-delivery locker for storing packages. Moreover, a user needs to carry his or her package to a package pickup site such as the home-delivery locker.

In addition, most of the services which return a package deposited by a user after a prescribed time, such as a coin-operated laundry, involve use of appliances installed in a facility. Accordingly, the user not only needs to spend time and effort to carry a package to the facility, but also needs time to move to the facility and time to wait in the facility, which makes such services inefficient. Moreover, such a facility is often not very safe or elegant, and this discourages the user from using the services.

The present disclosure provides a server apparatus, a vehicle, a service provision system, and a non-transitory storage medium storing a program which can provide an efficient and more convenient service for receiving and returning a package to a user.

A first aspect of the disclosure provides a server apparatus, including circuitry configured to transmit, to an information terminal of a user, information regarding a service available to the user, receive, from the information terminal, information regarding the service, selected by the user, receive, from the information terminal, package information regarding a package of the user, first location information indicating a location to receive the package from the user, first time information indicating a time to receive the package from the user, second location information indicating a location to return the package, and second time information indicating a time to return the package, and arrange a specified vehicle based on the package information, the first location information, and the first time information.

According to the first aspect, first location information indicating the location to receive a package from a user and first time information indicating the time to receive the package from the user are received. Since a vehicle is arranged based on the received information, the movement of the user can be minimized and the movement time, or the like, of the user can be shortened. Hence, efficient provision of the service is achieved.

Here, the first location information and the second location information may be the information indicating a specified region. The information indicating a specified location selected, from a plurality of candidate locations adequate for deposit or return of the package, by the user may be received as the first location information or the second location information. The second location information may be the information indicating the same location information as the first location information. The server apparatus may also be configured to automatically set the current location of the user as the first location information or the second location information.

The first time information and the second time information may be the information indicating a specified time period. The information indicating a specified time period selected by the user, from a plurality of candidate time periods adequate for deposit or return of a package, may be received as the first time information or the second time information. For example, when an adjacent vehicle is unable to reach the location indicated by the first location information at the time indicated by the first time information, a time period at which the vehicle can reach the location is presented to the user for the user to select the time period. The information indicating the specified time period selected by the user may be received as the first time information or the second time information.

The second time information may be the time information based on the first time information. For example, the second time information may be the information indicating the time after a prescribed time from the time indicated by the first time information. The server apparatus may be configured to automatically set the current time as the first time information.

The package information regarding a package of a user may be the information that indirectly indicates the package without being limited to the information directly indicating the package. For example, in the case of a laundry service, the information indicating the weight of clothes subjected to the laundry service or the information that identifies a washer dryer having a specified washing capacity is included in the package information that indirectly describes the package to be deposited.

In the first aspect, the service may be a package keeping service including returning the package received from the user after keeping the package for a prescribed time in the vehicle.

In the first the service may be a laundry service including returning the package received from the user, after doing laundry for the package in the vehicle.

The service may be a service that includes receiving food materials from a user, cooking the food materials, and returning cooked foods to the user. The service may further be a container service that includes keeping books, or the like, possessed by a user, and returning the books or the like after a prescribed period (for example, several months). In addition, the present disclosure may widely be applied to services involving keeping a corporeal property received from a user, and returning the corporeal property as it is or after specified processing.

The property received from a user may be retained in a vehicle until the property is returned to the user, so as to make it possible to provide a service completed within a vehicle. Furthermore, as compared with the case of providing a service, such as a laundry service, with use of an in-vehicle facility while moving the vehicle, the time required for laundry and the time required for movement to and from a laundry service facility are required in the past. However, in the case of one aspect of the present disclosure, it becomes possible to move while providing the service. Hence, the time required for providing the service can be shortened.

In the first aspect, the circuitry may be configured to compare a difference between the second time information and the first time information with a time taken for the vehicle to move from the location indicated by the first location information to the location indicated by the second location information.

In the first aspect, the circuitry may be configured to receive, from a plurality of vehicles, information indicating current locations of the vehicles, and select a vehicle to be arranged, out of the vehicles, based on the information indicating the current locations.

In the first aspect, the first location information and the second location information may be information indicating the same location.

In the first aspect, the circuitry may be configured to select, as the specified vehicle, a vehicle determined to reach the location indicated by the first location information at the time indicated by the first time information and to reach the location indicated by the second location information at the time indicated by the second time information, and the circuitry may be configured to arrange the specified vehicle by transmitting the first location information, the first time information, the second location information, and the second time information to the specified vehicle.

In the first aspect, the service may include at least one step executed in the vehicle, and the circuitry may be configured to arrange the specified vehicle at least based on a condition that the step is executable by the specified vehicle between the time indicated by the first time information and the time indicated by the second time information.

A second aspect of the disclosure provides a vehicle including: a receiver configured to receive at least first location information indicating a location to receive a package from a user, first time information indicating a time to receive the package from the user, second location information indicating a location to return the package, and second time information indicating a time to return the package, from a server apparatus, the server apparatus being configured to transmit, to an information terminal of a user, information regarding a service available to the user, to receive, from the information terminal, information regarding the service, selected by the user, to receive, from the information terminal, package information regarding the package of the user, the first location information, the first time information, second location information, and second time information, and to arrange a specified vehicle based on the package information, the first location information and the first time information; and a processing device configured to process information indicating a route to reach the location indicated by the first location information from a current location of the vehicle at the time indicated by the first time information, and information indicating a route to reach the location indicated by the second location information from the location indicated by the first location information at the time indicated by the second time information.

The information indicating a route may be processed so as to be displayed for the driver, or the like, of the vehicle on a display device or the like. However, the information is not limited to this. For example, the information may be processed for making an automatic driving controller drive the vehicle based on the information indicating the route.

The vehicle receives first time information indicating the time to receive the package from the user, second location information indicating the location to return the package, and second time information indicating the time to return the package. The vehicle also receives, from a server apparatus that arranges a specified vehicle based on the received package information, first location information and first time information, at least the first location information, the first time information, the second location information, and the second time information. This makes it possible to minimize the movement of the user and to shorten the movement time or the like. Therefore, the service of receiving and returning a package can efficiently be provided to the user.

In the second aspect, the vehicle may include a facility configured to perform at least one process of the service.

In the second aspect, the service may be a laundry service including returns the package received from the user after doing laundry for the package in the vehicle, and the vehicle may include a facility configured to do laundry for the package, received from the user, in the vehicle.

In the second aspect, the vehicle may include a plurality of facilities, such as washers, and dryers, which are required for providing the service. In order to provide the service to a large number of users at the same time, the vehicle may be a large vehicle.

A third aspect of the disclosure provides a service provision system, including: a plurality of vehicles; and a server apparatus including circuitry configured to transmit, to an information terminal of a user, information regarding a service available to the user, receive, from the information terminal, information, regarding the service, selected by the user, receive, from the information terminal, package information regarding a package of the user, first location information indicating a location to receive the package from the user, first time information indicating a time to receive the package from the user, second location information indicating a location to return the package, and second time information indicating a time to return the package, and arrange a specified vehicle based on the package information, the first location information, and the first time information.

The service provision system includes the reception means for receiving, from the information terminal, the package information regarding the package of the user, the first location information indicating the location to receive the package from the user, the first time information indicating the time to receive the package from the user, second location information indicating the location to return the package, and the second time information indicating the time to return the package, and the arrangement means for arranging a specified vehicle based on the received package information, first location information, and first time information. This makes it possible to minimize the movement of the user and to shorten the movement time or the like. Therefore, the service of receiving and returning a package can efficiently be provided to the user.

A fourth aspect of the disclosure provides a non-transitory storage medium storing a program. The program causes, upon execution by a computer, the computer to execute an operation including: receiving, from a server, information regarding a service available to a user; transmitting, to the server, information regarding the service, selected by the user; and transmitting, to the server, package information regarding the package of the user, first location information indicating a location to receive the package from the user, first time information indicating a time to receive the package from the user, second location information indicating a location to return the package, and second time information indicating a time to return the package. Such a program is recordable on a storage medium, such as a semiconductor memory and a magnetic disk, mounted on a user terminal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a table showing vehicle status information;

DETAILED DESCRIPTION

Hereinafter, embodiments of the present disclosure will be described in details with reference to the drawings. Here, component members having identical or like functions are designated by identical reference signs to omit or simplify the description.

The embodiments to be disclosed below are merely illustrative for description of some aspects of the present disclosure, and are not presented for restrictive interpretation of the disclosure. The present disclosure may be implemented with modifications of the following disclosure within the range of demonstration of general creativity of a person skilled in the art.

First Embodiment

Figure 1:
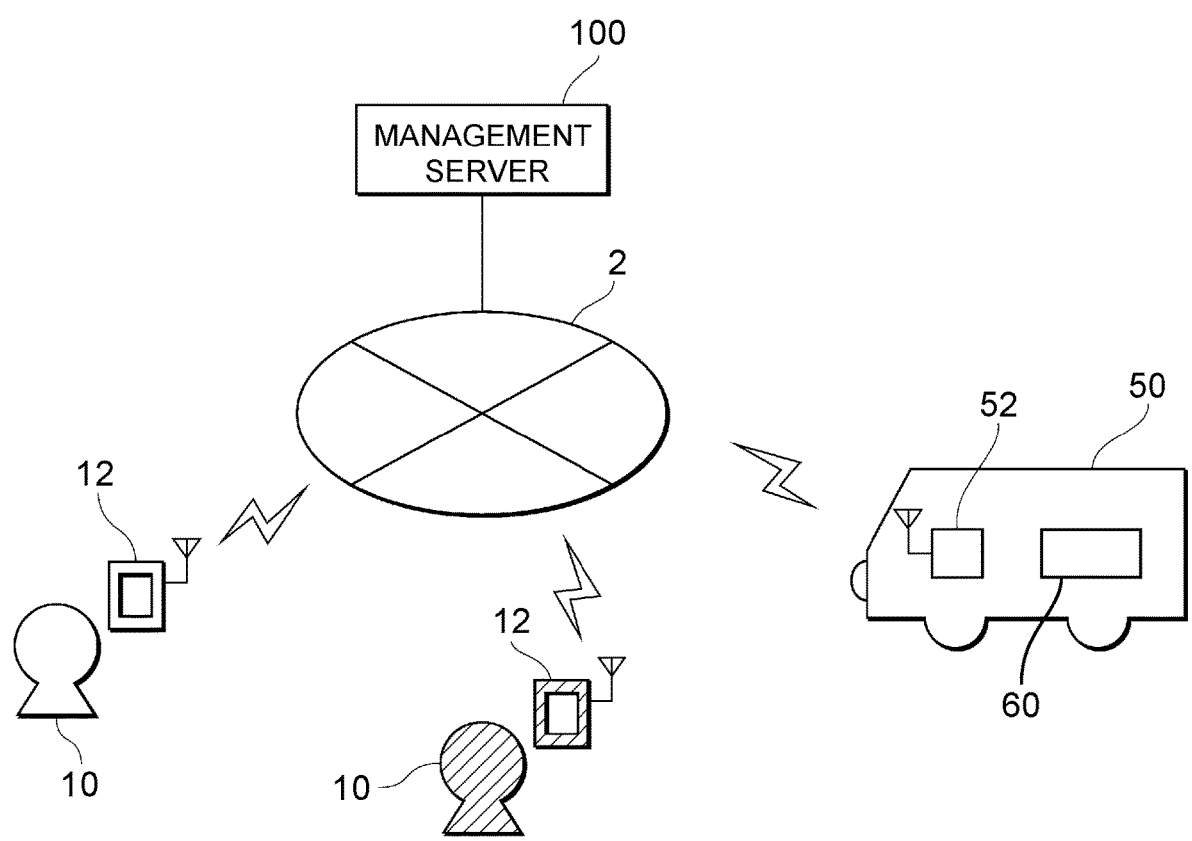
FIG. 1 shows an overall configuration of a system 1.

FIG. 1 shows the configuration of a system 1 for providing a laundry service (one example of "service involving receiving a package from a user and returning the package") according to the present embodiment.

The system 1 includes a plurality of user terminals 12 (one example of "information terminal of the user") held by a plurality of users 10, a plurality of vehicles 50 used for providing the service, and a management server 100 (one example of "server apparatus") for managing and providing a plurality of services including a laundry service. The management server 100 can communicate with each of the user terminals 12 and each of the vehicle terminals 52 of the vehicles 50 via a network 2. The management server 100 may be constituted of two or more servers. In order to enhance latency and reduce communication traffic, the management server 100 may be configured to perform distributed processing of regional information by providing for each region an edge server that is in a short distance from the users 10.

The users 10 (simply referred to as "users 10" when the users are collectively referred, whereas when each of the users is identified, referred to as "user 10A", "user 10B", and the like) are any members who join the laundry service provided by the company who manages the management server 100 and the vehicles 50. The users 10 pay a fee, for example, a monthly fee, corresponding to the contents of services provided by the laundry service.

Figure 2:
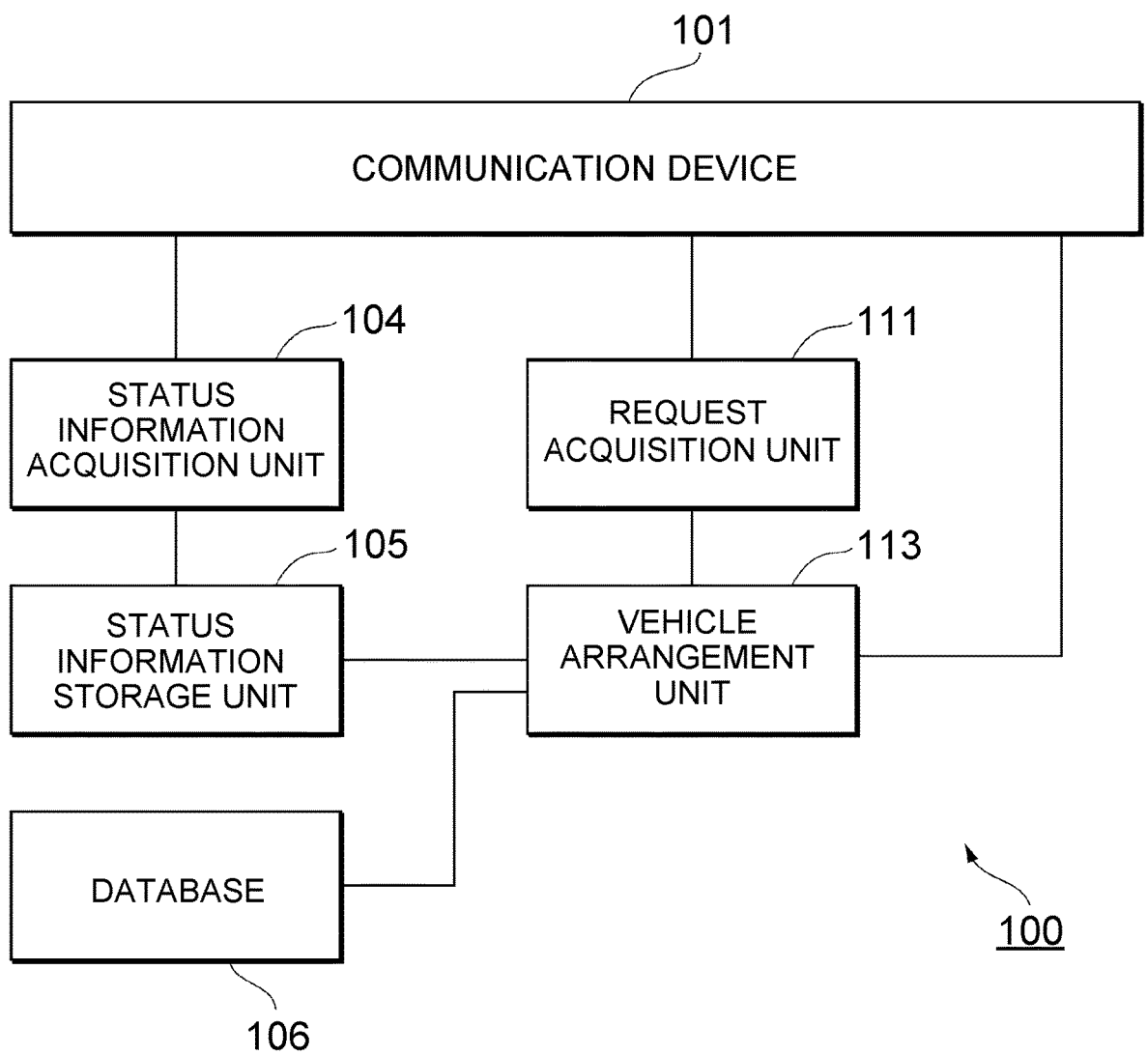
FIG. 2 is a functional block diagram of a management server 100.

FIG. 2 is a functional block diagram of the management server 100. The management server 100 manages the information on the users 10 and the vehicles 50, and arranges an appropriate vehicle 50 based on a request from a given user 10. The management server 100 includes a communication device 101, a status information acquisition unit 104, a status information storage unit 105, a database 106, a request acquisition unit 111, and a vehicle arrangement unit 113.

The functions of the management server 100 are implemented by electronic circuitry. Specifically, the functions are implemented by the electronic circuitry including an arithmetic processing processor, a temporary storage, a nonvolatile storage medium storing programs, a communication interface, an input device, and an output device. The processor is application specific integrated circuits (ASIC) for reading and executing programs (including a program that defines each arithmetic process in the present disclosure) stored in the storage medium. The temporary storage is constituted of a static random access memory (SRAM), or the like, to temporarily store part of the programs, operation data, and the like. The storage medium is a medium to store the program that defines each arithmetic process in the present disclosure and data such as map data, in an electrical, magnetic, optical, mechanical, or chemical manner, or in combination of these manners in a computer-readable state. For example, the storage medium is constituted of a magnetic disk or a semiconductor memory (such as a NAND flash memory). For example, the communication interface is wired or wireless communication interface circuitry for exchanging information with the outside. The management server 100 may include an input device and an output device. For example, the input device is a device for inputting information, such as a mouse, a keyboard, a touchpad, a keypad, and a microphone. For example, the output device is a device for outputting information, such as a display, and a speaker.

The communication device 101 is connected with the network 2 to allow transmission and reception of information necessary for providing the laundry service between the user terminals 12 of the users 10, who request the laundry service, and the vehicle terminals 52. The communication device 101 receives the laundry service requests or the like from users 10, from the user terminals 12, and transmits response information or the like to them, to the user terminals 12. The communication device 101 receives the information on locations of the vehicles 50 and vehicle status information (FIG. 4) indicating the operational status of washer dryers from the vehicle terminals 52. The communication device 101 also transmits instruction information to allocate specified vehicles 50 to the users 10.

The status information acquisition unit 104 extracts and acquires information on the locations of the users 10 that the communication device 101 receives from the user terminals 12. The status information acquisition unit 104 also extracts and acquires information on the locations of the vehicles 50, information on scheduled routes of the vehicles 50, and vehicle status information indicating the operational status of the washer dryers mounted on the vehicles 50 that the communication device 101 receives from the vehicle terminals 52.

The status information storage unit 105 records and updates status information regarding the users 10 and the vehicles 50 based on the information acquired by the status information acquisition unit 104. The vehicle status information will be described later.

The database 106 stores information such as map information, and member authentication information. The database 106 may further store road situations around the vehicles, received in real time from the communication device 101, in association with the location information.

The request acquisition unit 111 receives laundry service requests, place and time to deposit clothes or the like, and return place and time from the users 10.

Figure 5:
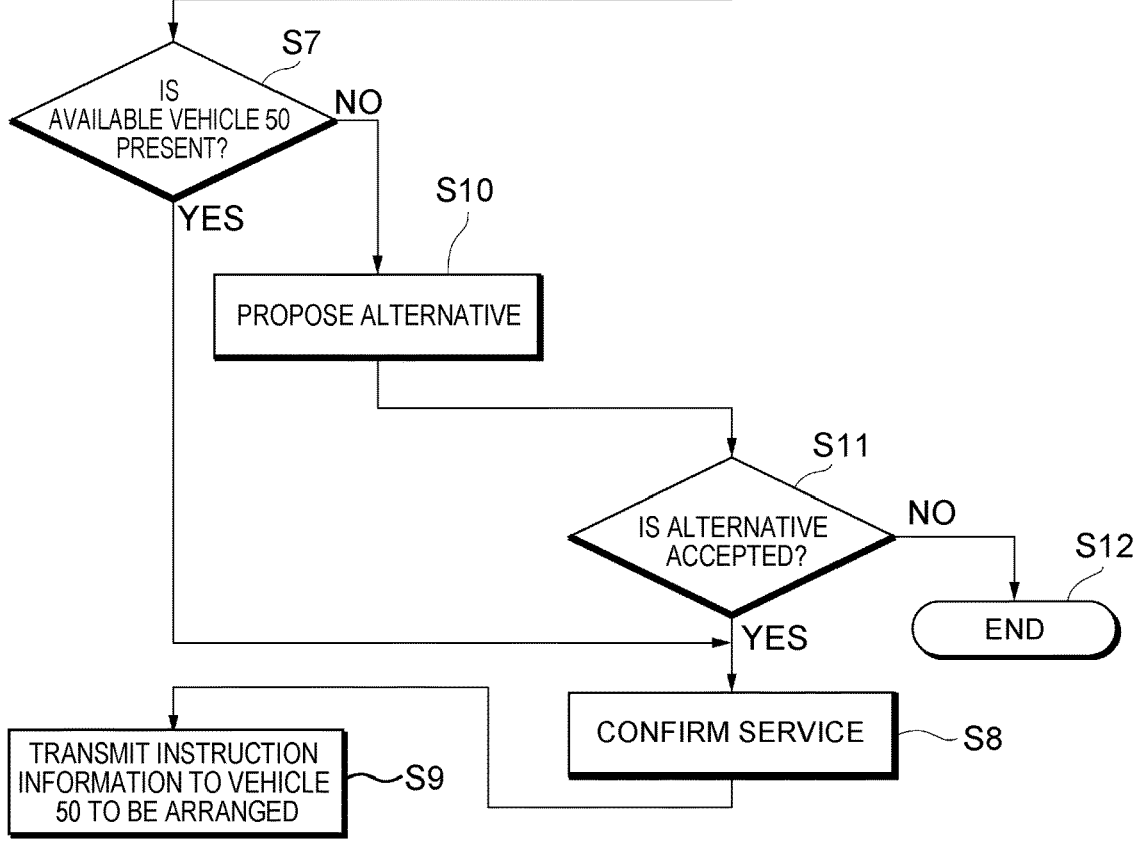
FIG. 5 is a flowchart showing a method for providing a laundry service.

Upon reception of a laundry service request from one of the users 10, the vehicle arrangement unit 113 performs an arithmetic process for selecting a specified vehicle 50 to be arranged for the user 10 with reference to the status information storage unit 105 and the database 106. The details of the arithmetic process will be described later (FIG. 5). Instruction information for allocating the selected vehicle 50 to the user 10 is transmitted to the selected vehicle 50 via the communication device 101.

The user terminals 12 are portable information terminals, such as smartphones and tablets, in which application software (hereinafter, referred to as "application") provided by the company that manages the laundry service is installed. For example, the user terminals 12 each include communication means for exchanging information with the management server 100 through the network 2, and a touch panel display that displays texts and images and accepts input from the users 10 by depressing. By starting up the application, the users 10 can transmit a laundry service request and other information to the management server 100, receive information from the management server 100, and display the information on the touch panel display.

The vehicles 50 are large-sized vehicles driven by staff members. The vehicles 50 may stand by in specified places, or may go specified routes until a vehicle allocation request is made from the management server 100.

The vehicles 50 each include a vehicle terminal 52 for communicating with the management server 100. The vehicles 50 may further include a device 60 that is configured to perform at least one of the processes of the service. For example, in the first embodiment, the vehicle 50 includes a plurality of large-sized washer dryers capable of washing and drying 16-kg clothes, bedding or the like, a plurality of medium-sized washer dryers capable of washing and drying 10-kg clothes, bedding or the like, and a washer dryer for sneakers. The vehicles 50 are configured to enable the users 10, who have been authenticated, come into the vehicles 50 from the rear door of the vehicles 50 and to operate the washer dryers. It takes, for example, 90 minutes for the large-sized washer dryers to complete washing and drying based on a normal menu, 60 minutes for the medium-sized washer dryers to complete the washing and drying, and 40 minutes for the washer dryers for sneakers to complete the washing and drying. The operational status of the washer dryers is configured to be transmitted to the management server 100 from the vehicle terminals 52 for every prescribed time.

The vehicles 50 may not include the same facilities, and may include different facilities for washing or drying. For example, a specified vehicle 50 may include the facility for providing laundry-related services, such as an ironing service, while having a laundry-related service staff stay in the vehicle to provide the laundry-related services at the same time. Unmanned automatic driving cars mounted with artificial intelligence may be used as the vehicles 50.

Figure 3:
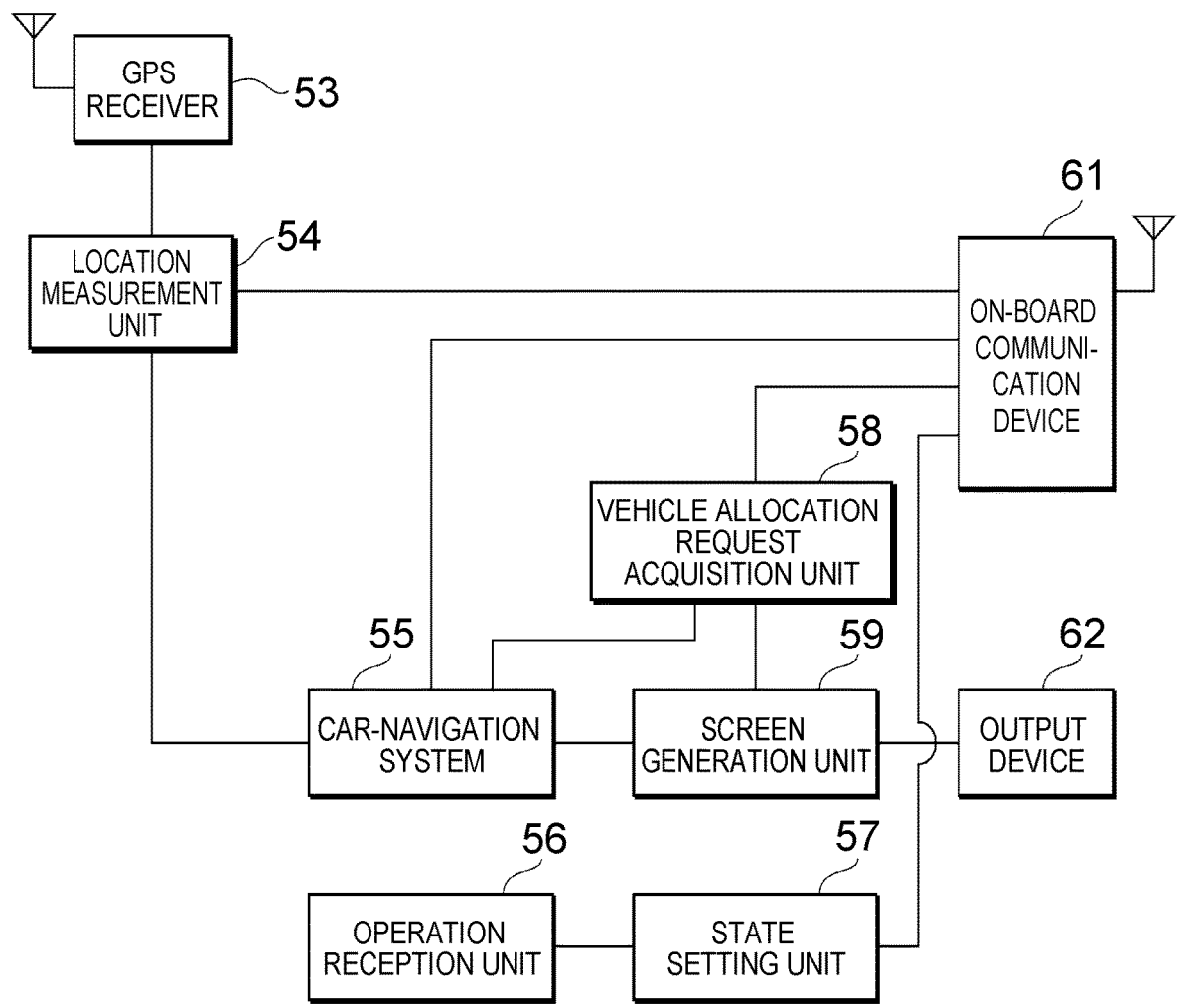
FIG. 3 is a functional block diagram of a vehicle terminal 52.

FIG. 3 is a functional block diagram of the vehicle terminal 52. The vehicle terminal 52 includes a GPS receiver 53, a location measurement unit 54, a car-navigation system 55, an operation reception unit 56, a state setting unit 57, a vehicle allocation request acquisition unit 58, a screen generation unit 59, an on-board communication device 61, and an output device 62. The output device 62 includes a display.

Since the vehicle terminal 52 includes the same hardware configuration as that of the management server 100, the description thereof is omitted. The vehicle terminal 52 includes a nonvolatile storage medium, a program (including the program that defines each arithmetic process executed by the vehicle terminals 52 of the present disclosure) recorded thereon, and a processor represented by application specific integrated circuits (ASIC) for executing the specified arithmetic processes in accordance with the program.

The on-board communication device 61 connects with the network 2 by wireless communication via wireless base stations or wireless access points to exchange information required for the services with the communication device 101 of the management server 100. The GPS receiver 53 receives GPS signals transmitted from a plurality of GPS satellites via a GPS antenna. The location measurement unit 54 measures the current location of the own vehicle terminal 52 based on the received GPS signals. Specifically, the location measurement unit 54 obtains the latitude and longitude of the own vehicle terminal 52 through calculation. The latitude and longitude constitute own terminal location information. The location measurement unit 54 periodically obtains and supplies the location information to the on-board communication device 61. The on-board communication device 61 periodically transmits the location information to the management server 100. The location measurement unit 54 also supplies the obtained location information to the car-navigation system 55. Even when the ignition switch of the own vehicle 50 is turned off, the functions of the GPS receiver 53, the location measurement unit 54, and the on-board communication device 61 may be maintained in an active state, and the on-board communication device 61 may periodically transmit the location information to the management server 100.

When acquiring instruction information indicating a vehicle allocation instruction from the vehicle instruction unit 115 of the management server 100, the vehicle allocation request acquisition unit 58 supplies information indicating the presence of the vehicle allocation request to the car-navigation system 55 and the screen generation unit 59. The instruction information includes at least identification information that identifies a specified user 10, and information indicating deposit place and time and return place and time desired by the user.

The screen generation unit 59 generates a message screen indicating the presence of a vehicle allocation request, and displays the message screen on the display of the output device 62. The message screen includes, for example, information indicating the name of a specified user 10 and the deposit place and time desired by the user 10.

A staff member who is driving the vehicle 50 recognizes the presence of the vehicle allocation request by viewing the message screen. The output device 62 may have a voice output function to notify the presence of the vehicle allocation request to the staff member by voice. When an unmanned automatic driving car mounted with artificial intelligence is used as the vehicle 50, it is not necessary to include the display, or the like, for outputting the received instruction information.

The car-navigation system 55 acquires, as one of via-points, deposit place location information in association with the deposit time, the deposit place location information being included in the instruction information received from the management server 100. The car-navigation system 55 also acquires, as one of the via-points, information on the location of the return place in association with the return time.

The car-navigation system 55 then acquires, through calculation, a new route with newly received two via-points incorporated in time series in the already acquired route that is constituted of a plurality of via-points. The management server 100 or other servers capable of communicating with the vehicles 50 may execute calculation of the route instead of the on-board terminal.

The screen generation unit 59 displays on the output device 62 the screen for guiding the route for reaching the via-point at a specified time. Thus, the staff member can drive to a next via-point so as to reach at the specified time.

The operation reception unit 56 receives operational input to a washer dryer mounted on the vehicle 50 from a staff member or the specified user 10. When the user 10 operates the washer dryer, the operation reception unit 56 receives the ID of the user 10. The state setting unit 57 transmits, from the on-board communication device 61 to the management server 100, the ID of the user 10 and information on the identification of the washer dryer to be operated, as the information indicating the operational status of the washer. When the user 10 extracts clothes or the like from the specified washer dryer after completion of washing and drying, the operation reception unit 56 similarly receives the ID of the user 10. The state setting unit 57 transmits, from the on-board communication device 61 to the management server 100, the ID of the user 10 and the information on the identification of the washer dryer to be operated, as the information indicating the end of the operation of the washer. The status information acquisition unit 104 of the management server 100 can acquire a period of time that the specified user 10 occupied the specified washer dryer by acquiring the information indicating the operational status. Based on the information, the company can charge the user 10.

FIG. 4 shows one example of the vehicle status information recorded on the status information storage unit 105 of the management server 100.

As shown in this drawing, the vehicle status information for the vehicles 50 includes identification information that identifies each of the vehicles 50, and latitude and longitude information indicating the current location of the vehicles 50. The vehicle status information also includes information indicating the operational status of the facilities (washer-dryers in the present embodiment) of each of the vehicles 50. Specifically, for every washer-dryer, the working time that is defined as the time from deposit to return of clothes or the like, and the idle time that is defined as the time other than the working time, are stored in association with the information on the identification of the user 10 who uses the pertinent washer-dryer.

Furthermore, the vehicle status information includes information regarding the travel state indicative of whether or not each of the vehicles 50 is in a traveling state or a parking state. The vehicle status information also includes route information.

The route information is the information on a plurality of via-points listed in time series with a deposit place that is recorded in association with a deposit time, or a return place that is recorded in association with a return time being defined as a via-point. The route information also indicates the routes between the via-points.

Hereinafter, a method for providing a laundry service with use of the system 1 will be described. FIG. 5 is a flowchart showing main processes of the method.

The management server 100 specifies staff members who are in charge of respective areas. The staff members wait for a vehicle allocation request, while driving their vehicles 50 in accordance with specified patrol routes in the areas in charge. The staff members may stop the vehicles 50 at specified places and wait for a vehicle allocation request. The management server 100 receives and updates the vehicle status information including the current location information acquired from GPS, and the operational status of the facilities from the vehicle terminals 52 of the respective vehicles 50.

When one of the users 10 starts up the application of the user terminal 12 and inputs his or her ID and a password, the user terminal 12 will transmit these ID and password to the management server 100 via the network 2.

Upon reception of the ID and the password of the user 10 from the user terminal 12, the management server 100 searches the database 106, and authenticates the user 10 (step S1). The management server 100 also extracts a service or services registered by the user 10, and transmits the information (one example of "information regarding available services") regarding the service or services to the user terminal 12 via the network 2 (step S2). Here, since the user 10 has registered the laundry service, the management server 100 transmits the information regarding the laundry service to the user terminal 12. When the user 10 has also registered other services involving vehicle use, the information regarding such services is also transmitted to the user terminal 12.

The information received from the management server 100 is displayed as the services available to the user 10 on the touch panel display of the user terminal 12. The user 10 inputs a desired service and other necessary information by pressing a specified position on the touch panel display or inputting voice with a microphone. For example, the user 10 selects and inputs a washing and drying service (one example of "information regarding the service selected by the user") from a pull-down menu displayed on the touch panel display of the user terminal 12 (step S3).

Furthermore, the user 10 also selects and inputs that the amount of clothes or the like is 10 kg or less (one example of "package information regarding the package of the user") from the pull-down menu displayed on the touch panel display (step S4). A washing and drying menu with a medium-sized dryer washer may be displayed on the touch panel display for the user to select. In this way, information including the service desired by the user and the information on a package subjected to the service may be input and received.

Next, the user 10 inputs a desired time (one example of "first time information") to deposit clothes or the like with use of the user terminal 12. Here, instead of the user inputting a specific time, a menu to deposit clothes or the like as soon as possible (one example of "first time information") may be displayed on the user terminal 12 to receive selection input by the user 10.

The user 10 further inputs a desired place to deposit clothes or the like (one example of "first location information") with use of the user terminal 12 (step S5). For example, the user 10 can input a specific address as a desired place to deposit clothes or the like. Instead of the user 10 inputting a specific address or the like, a menu to select current location (one example of "first location information") may be displayed on the user terminal 12 to receive selection input by the user 10.

Similarly, the user 10 inputs a desired time (one example of "second time information") to have the clothes or the like returned with use of the user terminal 12. Here, instead of the user 10 inputting a specific time, a menu to have the clothes or the like returned as soon as possible (one example of "second time information") may be displayed on the user terminal 12 to receive selection input by the user 10. The application may have a preinstalled table that associates specified services with minimum required time for each of the services. When the minimum required time for the service selected by the user is longer than the time from deposit to return of clothes or the like input by the user, the application may be configured to prohibit and reject such input of time.

Similarly, the user 10 inputs a desired place of having the clothes or the like returned (one example of "second location information") with use of the user terminal 12 (step S6). Instead of inputting a specific address or the like, information for selecting the current location (one example of "second location information") and the location (one example of "second location information") same as the place to deposit clothes or the like may be received as a return place. The user terminal 12 transmits these pieces of input information to the management server 100.

The request acquisition unit 111 of the management server 100 receives information indicating the washing and drying service for the clothes or the like with the amount of 10 kg or less as the service desired by the user, and information regarding the desired time and place to deposit the clothes or the like, and the desired time and place of having the clothes or the like returned. The vehicle arrangement unit 113 of the management server 100 determines the presence of the vehicle 50 which can be arranged for the user 10, out of the vehicles 50 under management, and performs calculation processing for selecting the vehicle 50 to be arranged (step S7).

First, the management server 100 identifies a medium-sized washer dryer and a large-sized washer dryer as a facility capable of providing the washing and drying service for clothes or the like with the amount of 10 kg or less that is desired by the user 10.

Next, the management server 100 extracts the vehicles 50 having at least one medium-sized washer dryer or large-sized washer dryer which is not in operation from the desired time to deposit clothes or the like to the desired time to have the clothes or the like returned, with reference to the status information storage unit 105.

The vehicle arrangement unit 113 of the management server 100 determines whether or not the extracted vehicle 50 can go to the desired place at the desired time. Specifically, with reference to the status information storage unit 105, the vehicle arrangement unit 113 determines based on information such as the route information reflecting desired deposit time and place and desired return time and place of clothes or the like received from the user terminal 12 of the another user 10.

For example, consider the situation where a certain user 10A desires deposit of clothes or the like at a point A (for example, the location of the residence of the user 10A) at 10:00 p.m. and have the clothes or the like returned at a point A' at 7:00 a.m. next morning, but a specified vehicle 50 already has a schedule immediately before 10:00 p.m., that is to return clothes or the like at a point B at 9:20 p.m. for another user 10B, and has a schedule immediately after 10:00 p.m., that is to receive clothes or the like at a point C at 11:15 p.m. from yet another user 10C. In the above situation, the management server 100 simulates whether or not the vehicle 50, which leaves the point B at 9:30 that is the time obtained by adding 10-minute margin for the process such as returning the clothes to 9:20 p.m., can reach the point A at 10:00 p.m. (or the time immediately before 10:00 p.m.). Similarly, the management server 100 simulates whether or not the vehicle 50, which leaves the point A at 10:10 p.m. that is the time obtained by adding 10-minute margin for the process such as deposit of clothes or the like, can reach the point C at 11:15 p.m. As a result of the simulations, when determining that the vehicle 50 can move from the point B to the point A and from the point A to the point C in time, the management server 100 determines that the vehicle 50 can move to the point A at 10:00 p.m. for the user 10A.

When the specified vehicle 50 does not have any closest schedule, the management server 100 determines whether or not the vehicle 50 can go to the point A at 10:00 p.m. based on the current location of the vehicle 50.

Similarly, as for the desired return time, the management server 100 determines whether or not the vehicle 50 can move to the point A' at 7:00 a.m. next day, based on the schedule of other users 10 immediately before and immediately after 7:00 a.m. next day. When the closest schedule of the vehicle 50 relates to deposit of clothes or the like by the user 10A at 10:00 p.m., the management server 100 determines whether or not the vehicle 50, which leaves the point A at 10:10 p.m. that is the time obtained by adding 10-minute margin, can reach the point A' at 7:00 a.m. next day. In the case where the point A' is a remote place, and so the vehicle 50 cannot reach the point A' at 7:00 a.m. next day, or the point A' is out of the service area, the management server 100 transmits to the user terminal 12 a message encouraging the user to specify a different point or time.

When there are two or more vehicles 50 which are available for deposit of clothes or the like by the user 10A or return of the clothes or the like to the user 10A, it is possible to prioritize the vehicles 50 based on a specified reference. For example, the vehicles 50 may be prioritized such that the vehicles 50 with a shorter travel distance are more preferable. The vehicles 50 may also be prioritized such that the vehicles 50 without tight schedule before and after the desired time are more preferable, or the vehicles 50 having a medium-sized washer-dryer available is more preferable than those having a large-sized washer-dryer available.

As a result of such calculation processing, when the management server 100 can arrange the vehicle 50 as desired by the 10A, the management server 100 transmits the notification and the expense or the like to the user 10A for confirmation of the details of the service scheduled to be provided in the end. The user 10A gives final approval with use of the user terminal 12, and confirms the service (step S8).

Upon reception of the information indicating the final approval from the user terminal 12, the management server 100 transmits to the vehicle 50 to be arranged instruction information including the deposit place and time and the return place and time desired by the user 10A (step S9). The vehicle terminal 52 of the vehicle 50 receives the desired deposit place and time and the desired return place and time from the management server 100. The received information is recorded on a recording terminal of the vehicle 50, and is taken into the route of the vehicle 50.

When the vehicle 50 as desired by the user 10A is not present, the message to that effect is transmitted to the user terminal 12, and a providable alternative can also be transmitted (S10).

For example, assume the case where the specified vehicle 50 is movable to the point A at 10:00 p.m. for the user 10A, but the specified vehicle 50 is unable to return the clothes or the like at the point A at 7:00 a.m. next day. In this case, if the specified vehicle 50 can return the clothes or the like at the point A in the time period after 11:00 p.m. and before 6:15 a.m. next day, the alternative plan is proposed to the user 10A. The user 10A can input a desired return time (one example of "second time information") anew, and transmit the desired return time to the management server 100.

When the user 10 selects a menu to deposit clothes or the like as soon as possible, the management server 100 performs the same processing for the vehicles 50 present around the desired deposit place of the clothes or the like at the current time.

Specifically, the management server 100 extracts, out of the vehicles 50 having at least one medium-sized washer dryer or a large-sized washer dryer not in operation for a prescribed time (for example, 3 hours) from the current time, the vehicles 50 present around the desired place to deposit clothes or the like by the user 10. The management server 100 then calculates the time at which the vehicles 50 can move to the desired place desired by the user 10. The management server 100 calculates, for the vehicle which can reach the desired place desired by the user 10 at the earliest among these vehicles, the earliest time that the vehicle can reach the return place desired by the user 10 after the laundry service is provided. The management server 100 then transmits to the user terminal 12 the earliest deposit time and return time available to the user 10A together with the expense or the like.

The user 10A determines whether or not to accept the proposed schedule, such as the alternative, with the user terminal 12 (step S11). When the user 10A accepts the proposed schedule, the user 10A gives final approval (step S8). Upon reception of the information indicating the final approval from the user terminal 12, the management server 100 arranges a vehicle by transmitting the deposit place and time desired by the user 10A and the desired return place and time to the vehicle 50 to be arranged (step S9). The vehicle terminal 52 of the vehicle 50 receives the deposit place and time and the desired return place and time from the management server 100. The received information is recorded on the recording terminal of the vehicle 50, and is taken into the route of the vehicle 50. When the user 10A does not accept the proposed schedule, such as the alternative, the process is ended (step S12).

The vehicle 50 takes the deposit place and time and the desired return place and time received from the management server 100 into the route. When the vehicle 50 does not have any preceding destination or schedule, the route for reaching the specified place at the specified time from the current location is calculated. However, unlike normal route calculation, a shortest route or fastest route for reaching the destination is not necessarily calculated.

For example, assume the case where the vehicle 50 is scheduled to return clothes or the like to the user 10B at time t1 at the point B, and then receives deposit of clothes or the like from the user 10A at time t2 at the point A. In this case, if the vehicle 50 proceeds with the shortest route, the vehicle 50 may reach the point A too soon.

In such a case, for example, the vehicle 50 may proceed based on the shortest route from the point B to the vicinity of the point A, and then the vehicle 50 dares to select a route that is not the shortest route so as to be able to reach the point A at specified time t2.

Alternatively, the vehicle 50 may search for the place to stand by in the vicinity of the point A, proceed based on the shortest route from the point B to the standby place, stand by in the standby place, and then proceed based on the shortest route from the standby place to the point A.

Alternatively, the vehicle 50 may move up to the vicinity of the point A at speeds close to the upper limit of legal speed. After reaching the vicinity of the point A, the vehicle 50 may be controlled to reach the point A at specified time t2, while dynamically calculating the travel speed or the moving route of the vehicle 50 in consideration with the current time and the distance to the point A.

Then, when the vehicle 50 reaches the point A or reaches close enough to the point A at time t2 or several minutes before time t2, the vehicle terminal 52 of the vehicle 50 notifies the management server 100 that the vehicle 50 has reached the point A or is expected to reach in several minutes. The management server 100 notifies the user 10A that the vehicle 50 has reached the point A. The user terminal 12 shows the location of the vehicle 50 on the map based on the information from the management server 100.

Figure 6:
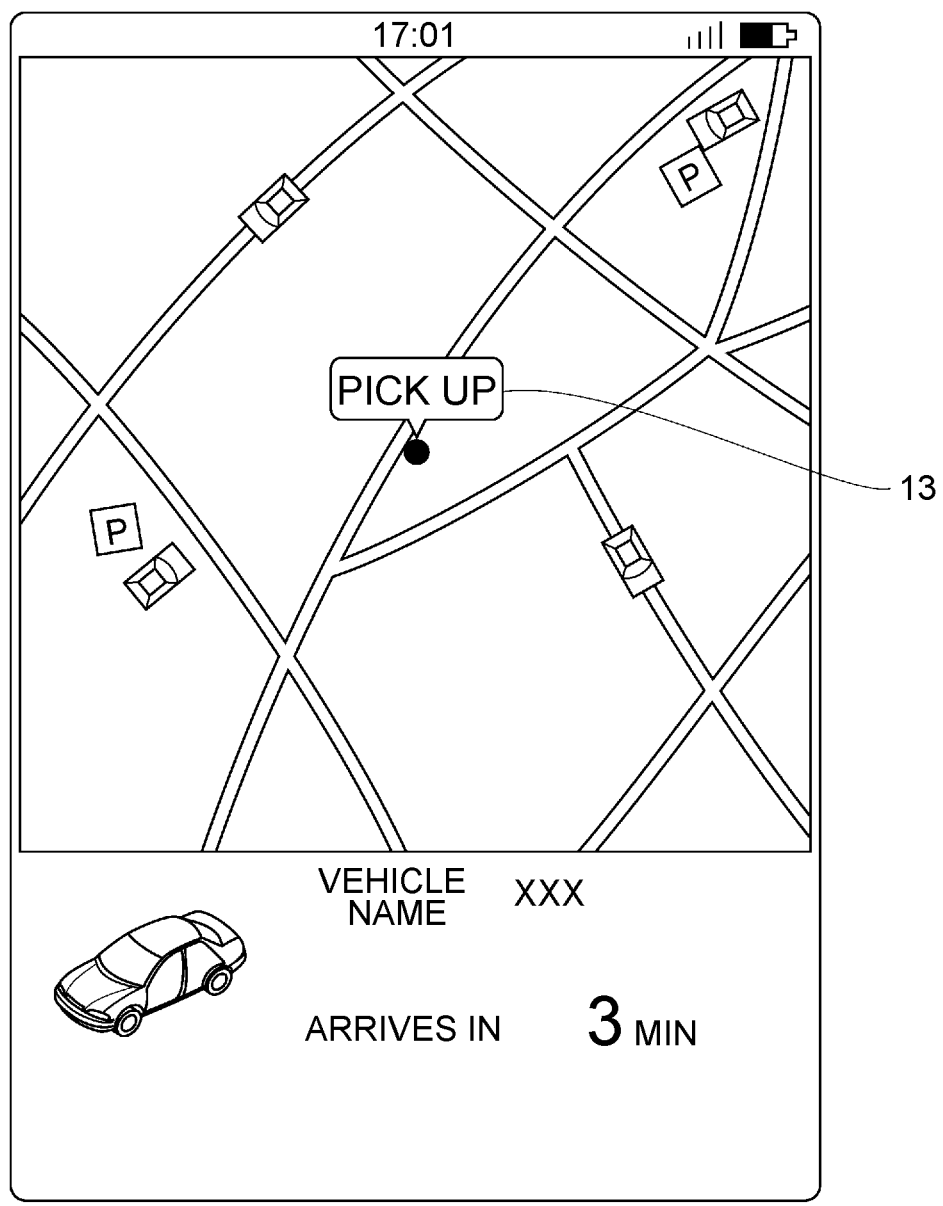
FIG. 6 is a display screen of a touch panel display of a user terminal 12.

FIG. 6 is a schematic view showing the touch panel display of the user terminal 12, in which a stopping location of the vehicle 50 represented by a balloon 13 expressing "PICKUP" and an external appearance of the vehicle 50 are displayed. FIG. 6 shows the display of the touch panel display in the case where the vehicle 50 reaches the stopping location in three minutes, and the notification is transmitted to the user terminal 12.

When finding the vehicle 50 stopped at the point A, the user 10A transmits a request for unlocking the vehicle 50 to the management server 100 with the user terminal 12.

In response to the request from the user terminal 12, the management server 100 transmits an unlock command to the vehicle terminal 52. The vehicle 50 is unlocked in response to the command.

When the vehicle 50 is unlocked, the user 1A goes into the vehicle 50, places clothes or the like into the specified washer dryer, and performs operation for starting washing and drying with the washer dryer with use of the operation reception unit 56.

Then, the user 10A goes out of the vehicle 50, and operates the user terminal 12 to notify the management server 100 that the deposit was completed.

In response to the notification, the management server 100 notifies the vehicle terminal 52 that the deposit was completed.

Based on the notification, the vehicle 50 is automatically locked and leaves toward the next destination. At the same time, washing of the clothes or the like deposited by the user 10A is started.

At the time of return of the clothes or the like, the user 10A can have the clothes or the like returned from the vehicle 50 in accordance with the same process.

Thus, in the system 1 for providing the laundry service according to the present embodiment, when clothes or the like are deposited, not only the desired deposit time and place, but also the desired return time and place are input. The management server 100 determines the feasibility of deposit of clothes or the like from a specified user 10 and return of the clothes or the like to the specified user 10 in consideration of information such as deposit and return time and place of other users who receive the service provided by the same vehicle 50. This makes it possible to arrange the vehicle 50 that does not compromise provision of the service to other users. Therefore, the system 1 can provide the user 10 with an efficient and highly convenient service which eliminates the necessity of carrying clothes, bedding, or the like to the facilities such as coin-operated laundries.

Since the return place and return time of clothes or the like can freely be set, it becomes unnecessary to go to the facilities, such as coin-operated laundries, or to wait until washing or other services are finished in these facilities. Furthermore, since the users are free from worrying about their clothes or the like being seen by others, they can enjoy the service in peace. Furthermore, it becomes possible to efficiently enjoy the laundry service by using the nighttime or the like. Even in the case of a long stay in accommodation facilities, such as hotels, without washer dryers, the laundry service can be used by specifying hotels or the like as the deposit place and the return place of clothes or the like.

Furthermore, since the laundry service can be provided with use of the facility in the vehicle 50, it becomes possible to have the deposited clothes or the like returned after the lapse of time that is taken for the laundry service at the shortest. Therefore, it becomes possible to provide the service in a very short time as compared with the system where delivery and laundry service are separated.

Family members or the like may be allowed to share the same account, and another user 10 having another user terminal 12 authenticated based on ID and password may have the clothes or the like returned.

In the case where the place specified by the user 10 as a deposit or return place is not appropriate, the message to that effect may be transmitted and other adjacent places may be proposed.

User authentication may be performed by using various methods. In addition to password entry, data on fingerprints, face, and the like may be acquired for authentication. Although various aspects of the method for deriving a route have been disclosed, the method may be configured such that the fastest route to the destination can also be derived when a request, such as a request to deposit clothes as soon as possible, is received.

First Modification

The first embodiment has been described in the case of being applied to the laundry service as one example of the services involving receiving and returning a package from a user. However, the present disclosure is widely applicable to other services. Hereinafter, difference from the first embodiment will mainly be described, while description of the features that can be implemented with the same configuration or functions apparent to those skilled in the art will be omitted or simplified.

In one example, the present disclosure is applicable to a package delivery service involving receiving a package from a user 10 and handing over the package in a specified place.

For example, the management server 100 may be configured to allow the user 10 to select the package delivery service instead of the laundry service with the user terminal 12 and to allow the user 10 to input package deposit place and time and return place and time from the user terminal 12 at the time of application of the service. The management server 100 may be configured to select and allocate, based on these pieces of information and similar information on other users 10, an optimum vehicle 50 out of the vehicles 50.

In this configuration, the management server 100 determines the feasibility of deposit of a package from a specified user 10 and return of the package in consideration of information such as deposit and return time and place of other users who receive the service provided by the same vehicle 50. This makes it possible to arrange the vehicle 50 that does not compromise provision of the service to other users. Therefore, it becomes possible to provide the user 10 with an efficient and highly convenient service which eliminates the necessity of carrying a package to a specified pickup site.

For example, at the time of a business trip, the user 10 may deposit his or her luggage in the residence of the user 10, and have the luggage returned at an airport. The user 10 may also deposit clothes or the like, rented for a specified event such as wedding, in a rental shop, and have the clothes or the like returned at the place of the event.

Second Modification

In another example, the present disclosure is also applicable to a container service for receiving a large amount of books, art pieces, or the like from a user 10, keeping the packages in the vehicle 50 for a long period of time (for example, several months), and returning the packages in the place specified by the user 10.

For example, the management server 100 may be configured to allow the user 10 to input package deposit time and place and return place and time from the user terminal 12 at the time of application of the container service, and to select and allocate, based on these pieces of information and similar information on other users 10, an optimum vehicle 50 out of the vehicles 50. The vehicle 50, during keeping the packages, may stand by at a remote place with a low parking fee, and move for package deposit when another user 10 applies to the service.

With this configuration, it becomes possible to provide the user 10 with an efficient and highly convenient service which eliminates the necessity of carrying a package to a specified pickup site.

The embodiments described in the foregoing are presented for easy understanding of the present disclosure and is not presented for restrictive interpretation of the disclosure. Respective elements included in the embodiments, and their arrangement, materials, conditions, forms, sizes and the like are not limited to those disclosed in the embodiments, but may properly be changed. Some component members described in different embodiments may be replaced or combined with each other.

In this specification, "unit", "means", and "procedure" do not simply refer to physical component members. Rather, they also refer to the cases where the processes performed by "unit" or the like are implemented by software. Moreover, the processes performed by one "unit" or the like or one device may be executed by two or more component members or devices. The processes performed by two or more "units" or the like or two or more devices may be executed by one component member or device.

What is claimed is:

1. A server apparatus, comprising
circuitry configured to
transmit, to an information terminal of a user, information regarding a plurality of services available to the user including a laundry service,
receive, from the information terminal, information regarding the laundry service, selected from the plurality of services by the user,
receive, from the information terminal, package information regarding a package of the user, first location information indicating a location to receive the package from the user, first time information indicating a time to receive the package from the user, second location information indicating a location to return the package, and second time information indicating a time to return the package, arrange a specified vehicle based on the package information, the first location information, and the first time information, the specified vehicle having a lock, when the specified vehicle is at the location to receive the package from the user, notify the user that the specified vehicle has reached the location to receive the package from the user based on GPS signals received from a GPS receiver of the specified vehicle, receive, from the information terminal, an unlock signal, which causes an unlock command to be transmitted to the specified vehicle to automatically and physically unlock the lock of the specified vehicle, the unlock signal is provided when the specified vehicle is determined to be at the location to receive the package from the user based on the GPS signals received from the GPS receiver of the specified vehicle, and when a subsequent signal is received from the information terminal indicating the package has been dropped off by the user, the subsequent signal causes a lock command to be transmitted to the specified vehicle to automatically and physically lock the lock of the specified vehicle and causes the laundry service selected by the user to be performed by a device of the vehicle.

2. The server apparatus according to claim 1, wherein the service is a package keeping service including returning the package received from the user after keeping the package for a prescribed time in the vehicle.

3. The server apparatus according to claim 1, wherein the laundry service includes returning the package received from the user, after doing laundry for the package in the vehicle.

4. The server apparatus according to claim 1, wherein the circuitry is configured to compare a difference between the second time information and the first time information with a time taken for the vehicle to move from the location indicated by the first location information to the location indicated by the second location information.

5. The server apparatus according to claim 1, wherein the circuitry is configured to receive, from a plurality of vehicles, information indicating current locations of the vehicles, and select a vehicle to be arranged, out of the vehicles, based on the information indicating the current locations.

6. The server apparatus according to claim 1, wherein the first location information and the second location information are information indicating the same location.

7. The server apparatus according to claim 1, wherein the circuitry is configured to select, as the specified vehicle, a vehicle determined to reach the location indicated by the first location information at the time indicated by the first time information and to reach the location indicated by the second location information at the time indicated by the second time information, and the circuitry is configured to arrange the specified vehicle by transmitting the first location information, the first time information, the second location information, and the second time information to the specified vehicle.

8. The server apparatus according to claim 1, wherein the service includes at least one step executed in the vehicle, and the circuitry is configured to arrange the specified vehicle at least based on a condition that the step is executable by the specified vehicle between the time indicated by the first time information and the time indicated by the second time information.

9. A system comprising a vehicle, a processing device, and a server apparatus, wherein:

the vehicle having a lock, the vehicle comprising:
a device configured to perform a laundry service;
a receiver configured to
receive at least first location information indicating a location to receive a package from a user, first time information indicating a time to receive the package from the user, second location information indicating a location to return the package, and second time information indicating a time to return the package, from the server apparatus, the server apparatus being configured
to transmit, to an information terminal of a user, information regarding a plurality of services available to the user including the laundry service,
to receive, from the information terminal, information regarding the laundry service, selected from the plurality of services by the user,
to receive, from the information terminal, package information regarding the package of the user, the first location information, the first time information, second location information, and second time information,
to arrange the vehicle based on the package information, the first location information and the first time information,
when the vehicle is at the location to receive the package from the user, notify the user that the specified vehicle has reached the location to receive the package from the user based on GPS signals received from a GPS receiver of the vehicle,
to receive, from the information terminal when the vehicle is at the location to receive the package from the user, an unlock signal, which causes an unlock command to be transmitted to the specified vehicle to automatically and physically unlock the lock of the vehicle, the unlock signal is provided when the vehicle is determined to be at the location to receive the package from the user based on the GPS signals received from the GPS receiver of the vehicle, and
to receive, from the information terminal, a subsequent signal indicating the package has been dropped off by the user, the subsequent signal causes a lock command to be transmitted to the specified vehicle to automatically and physically lock the lock of the specified vehicle and causes the laundry service selected by the user to be performed by the device of the vehicle; and the processing device configured to process
information indicating a route to reach the location indicated by the first location information from a current location of the vehicle at the time indicated by the first time information, and
information indicating a route to reach the location indicated by the second location information from the location indicated by the first location information at the time indicated by the second time information.

10. The vehicle according to claim 9, further comprising a facility configured to perform at least one process of the service.

11. The vehicle according to claim 9, wherein
the laundry service returns the package received from the user after doing laundry for the package in the vehicle, and
the vehicle includes a facility configured to do laundry for the package, received from the user, in the vehicle.

12. A service provision system, comprising:
a plurality of vehicles, each vehicle of the plurality of vehicles having a lock and a device configured to perform a laundry service; and
a server apparatus including
circuitry configured to
transmit, to an information terminal of a user, information regarding a plurality of services available to the user including the laundry service,
receive, from the information terminal, information, regarding the laundry service from the plurality of services, selected by the user,
receive, from the information terminal, package information regarding a package of the user, first location information indicating a location to receive the package from the user, first time information indicating a time to receive the package from the user, second location information indicating a location to return the package, and second time information indicating a time to return the package,
arrange a specified vehicle of the plurality of vehicles based on the package information, the first location information, and the first time information,
when the specified vehicle is at the location to receive the package from the user, notify the user that the specified vehicle has reached the location to receive the package from the user based on GPS signals received from a GPS receiver of the specified vehicle,
receive, from the information terminal, an unlock signal, which causes an unlock command to be transmitted to the specified vehicle to automatically and physically unlock the lock of the specified vehicle, the unlock signal is provided when the specified vehicle is determined to be at the location to receive the package from the user based on the GPS signals received from the GPS receiver of the specified vehicle, and when a subsequent signal is received from the information terminal indicating the package has been dropped off by the user, the subsequent signal causes a lock command to be transmitted to the specified vehicle to automatically and physically lock the lock of the specified vehicle and causes the laundry service selected by the user to be performed by a device of the vehicle.

13. A non-transitory storage medium storing a program, the program, upon execution by a computer, causing the computer to execute an operation including:
receiving, from a server, information regarding a plurality of services available to a user including a laundry service;
transmitting, to the server, information regarding the laundry service from the plurality of services, selected by the user;
transmitting, to the server, package information regarding the package of the user, first location information indicating a location to receive the package from the user, first time information indicating a time to receive the package from the user, second location information indicating a location to return the package, and second time information indicating a time to return the package;
arranging a specified vehicle of a plurality of vehicles based on the package information, the first location information, and the first time information, the specified vehicle having a lock;
when the specified vehicle is at the location to receive the package from the user, notifying the user that the specified vehicle has reached the location to receive the package from the user based on GPS signals received from a GPS receiver of the specified vehicle;
receiving, from the information terminal, an unlock signal, which causes an unlock command to be transmitted to the specified vehicle to automatically and physically unlock the lock of the specified vehicle, the unlock signal is provided when the specified vehicle is determined to be at the location to receive the package from the user based on the GPS signals received from the GPS receiver of the specified vehicle, and
receiving, from the information terminal, a subsequent signal indicating the package has been dropped off by the user, the subsequent signal causes a lock command to be transmitted to the specified vehicle to automatically and physically lock the lock of the specified vehicle and causes the laundry service selected by the user to be performed by a device of the vehicle.

* * * * *